United States Patent Office 3,592,736
Patented July 13, 1971

3,592,736
PURIFICATION AND SEPARATION OF NEUTRAL PROTEASE FROM PIGMENT AND ALKALINE PROTEASE
Leonard Keay, Florissant, Mo., assignor to Monsanto Company, St. Louis, Mo.
No Drawing. Filed Aug. 14, 1968, Ser. No. 752,460
Int. Cl. C07g 7/02
U.S. Cl. 195—63                                    21 Claims

ABSTRACT OF THE DISCLOSURE

Water-clear enzyme solution, e.g., beer filtrate from *B. subtilis* microorganism production of enzymes or redissolved enzyme mixture, containing both neutral and alkaline protease, as well as undesirable impurities and pigments, can be treated to separate neutral protease from alkaline protease adsorption of neutral protease on hydroxylapatite and subsequent isolation thereof by elution therefrom. Impurities are also removed by the adsorption-elution process. Degree of purity of final neutral protease depends upon degree of purity of starting material.

BACKGROUND OF INVENTION (1) Field of invention

Enzymes; fractionation and purification of mixture of alkaline and neutral proteases.

(2) Prior art

Production of enzyme mixtures by *Bacillus subtilis* microorganisms is known. Production of proteases from *Bacillus subtilis* species AM, a mutated *Bacillus subtilis* organism, is described and claimed in U.S. Pat. 3,031,380, issued Apr. 24, 1962. Separation of the proteases produced by this or related *Bacillus subtilis* microorganisms into neutral and alkaline protease fractions, and particularly isolation of the neutral protease fraction, has not previously been reported. Only two separations of neutral protease from alkaline protease have been reported to the best of our knowlege, and these involve fractionation on a column of DEADE-Sephadex (a diethylaminoethyl cross-linked dextran produced by AB Pharmacia, Uppsala, Sweden) or carboxymethycellulose, but these fractionations have been irreproducible in our hands employing mixtures of neutral and alkaline protease produced by avialable strains of *B. subtilis*.

It would therefore be highly desirable to provide a simple and generally applicable process whereby neutral and alkaline proteases, including those produced by the fermentation culture of a protease-producing strain of *B. subtilis* microorganism, could be readily separated into their component neutral and protease fractions, and whereby the various fractions, especially the neutral protease fraction, could be conveniently isolated if desired.

It is well known that various enzymes have various different activities or capacities. For example, amlyase is active in starch digestion. Protease, on the other hand, is effective in the digestion of protein material by hydrolysis or bond-splitting activity, neutral protease being active at substantially neutral pH's whereas alkaline protease is active at more alkaline pH's. When in combination, the various enzymes are frequently subject to autodigestion or endogenous deterioration. For this reason, and also because it is highly desirable to have specific enzymes available for use in various specific applications, the desirability of having the individual enzymes, as well as efficient methods for the separation of enzyme mixtures into their individual components, is readily apparent.

SUMMARY OF THE INVENTION

The present invention involves treatment of a water-clear solution of proteases, e.g., a clarified beer or aqueous solution of redissolved enzyme mixture solids, with hydroxylapatite to selectively adsorb the neutral protease fraction, to the substantial exclusion of the alkaline protease fraction, and thereafter eluting the adsorbed neutral protease from the said hydroxylapatite by contacting the same with an eluting solution adapted to release the adsorbed neutral protease from the hydroxylapatite on which adsorbed. According to the process, the neutral protease is readily separated from the alkaline protease and isolated if desired. Purification of the neutral protease is also effected by the process.

It was previously not recognized that it was possible to directly separate the proteases from a *B. subtilis* fermentation production into their component neutral and alkaline fractions in such a simple manner or by such a direct adsorption-elution process, or that the alkaline protease would not be adsorbed by the hydroxylapatite as well as the neutral protease, or that, if it were possible to adsorb the neutral protease to the substantial exclusion of the alkaline protease, it would be possible to elute the same from the hydroxylapatite in a convenient and facile manner and without destruction of its enzymatic activity. It has now been found, unpredictably, that neutral protease in a mixture of neutral and alkaline protease, e.g., as produced by a protease-producing strain of *B. subtilis*, is selectively adsorbed by hydroxylapatite to the substantial exclusion of alkaline protease present in the mixture and that the so-adsorbed neutral protease can be conveniently eluted from the hydroxylapatite, recovered, and isolated substantially free of alkaline protease, and also substantially free of pigments and most other undesirable impurities. Depending upon the purity of the starting solution, the neutral protease can be isolated not only substantially free of alkaline protease, but also substantially free of amylase, pigmentation, polysaccharides, and other undesirable impurities.

OBJECTS

The provision of a process having any or all of the above-enumerated advantages is an object of the invention. Additional objects will become apparent hereinafter, and still others will be obvious to one skilled in the art.

GENERAL DESCRIPTION OF THE INVENTION

The starting material for the process of the present invention is a water-clear fermentation beer, as obtained by filtration or centrifugation, or an aqueous extract of the enzyme mixture which may be obtained by redissolving a crude solid precipitated enzyme mixture, as obtained by precipitation of the enzyme-containing mixture of solids from the clarified fermentation beer using an excess of water-miscible organic solvent in which the enzyme mixture is insoluble, with further clarification if necessary. The solvent employed for such precipitation is preferably a polar solvent selected from the group consisting of lower-alkanols, e.g., isopropanol, lowered-alkyl ketones, e.g., acetone, and cyclic ethers, e.g., tetrahydrofuran and dioxane. Isopropyl alcohol and acetone are preferred solvents. The invention can also be applied to any other aqueous solution containing a mixture of proteases.

Hereinafter, the starting material will be referred to as the "solution." In either case, the starting material should be a water-clear fluid, which will ordinarily not contain solids visible to the naked eye, hence the designation "water-clear."

The essential step in the process of the invention, as already stated, is the fractionation by selective adsorption, of the mixture of proteases, including both neutral and alkaline protease, as produced by fermentation culture of a protease-producing strain of *B. subtilis*, employing hydroxylapatite as the adsorbent. The neutral protease is adsorbed and subsequently eluted, whereas the alkaline protease is unadsorbed.

According to the invention, if amylase is present in the starting solution, this is also adsorbed and appears in the eluate and in the final neutral protease product as a contamination if it is undesired. Some, but not all, pigment is also adsorbed unless removed earlier in the overall process as by adsorption using DEAE-cellulose or other anion exchange agent. If amylase is removed at an earlier stage of the total process, then it does not appear in the final neutral protease product. If pigment is removed at an earlier stage in the total process, then pigment is substantially absent from the final neutral protease product.

Therefore, if it is desired to obtain a neutral protease product substantially free of pigment, it is necessary to remove most of the pigment either from the beer or from a solution of the crude protease enzyme mixture before the hydroxylapatite fractionation, as by treatment with an anion exchange resin, as already indicated.

If it is desired to obtain a neutral protease product substantially free of amylase, it is accordingly necessary to remove the amylase before the hydroxylapatite adsorption, as by solvent fractionation in the presence of a calcium salt, or by ammonium sulfate fractionation followed by starch adsorption in the presence of aqueous ethanol to remove the last traces of amylase.

As is well known, hydroxylapatite is a hydroxide-treated crystalline form of calcium phosphate, which is readily available commercially and which may be used according to the invention in a batch, continuous, or column process, or in similar manner, according to the established art of adsorption-elution and chromatography. The column may advantageously be washed with dilute calcium acetate solution, e.g., 0.1% aqueous solution, prior to adsorption therewith.

The neutral protease is adsorbed onto the hydroxylapatite by bringing it into contact therewith, preferably in the form of an aqueous solution thereof, which may be stabilized by the addition of calcium acetate or other suitable soluble calcium salt, for example, the gluconate, the chloride, or the like. Preferably the stabilizing amount of the calcium salt is up to about 0.2%, and the preferred form is an about 0.1% calcium acetate aqueous solution. Such solutions are readily obtained by redissolving the solid obtained by solvent precipitation of the enzyme mixture, and filtering or centrifuging the resulting solution, or by directly filtering or centrifuging the fermentation beer, and adding the soluble calcium salt to the concentration desired. Additional processing may be effected upon this solution to remove other enzyme materials and undesired impurities, as will more fully appear hereinafter.

Elution of neutral protease from the hydroxylapatite is preferably effected by means of an eluting solution comprising an aqueous phosphate buffer, preferably at a strength greater than .04 M, but below the point where crystallization of the buffer occurs. Advantageously, aqueous phosphate buffer of .04–0.2 M is employed.

The adsorption is ordinarily effected at a pH between about 6 and 8, preferably between about 6.5 and 7.5, whereas the elution is ordinarily effected at a pH between about 6 and 8, preferably between about 6.8 and 7.5 and frequently also at a pH slightly higher than that employed during adsorption. The adsorption is preferably conducted employing a solution containing up to about 2.5% of dissolved solids, preferably about 1% of dissolved solids, or an enzyme level not greater than about 50,000 enzyme units per milliliter as determined by the Anson variation of the well-known Kunitz casein digestion method.

When operating in this manner, recoveries are usually between fifty and sixty percent of the neutral protease adsorbed by the hydroxylapatite, and frequently as high as 70% or even greater percentages of the neutral protease originally adsorbed on the hydroxylapatite. The process of the invention allows a clear, efficient fractionation of neutral from alkaline protease in a simple and convenient manner and gives a neutral protease product which is additionally purified of other impurities and pigments which are not adsorbed upon the hydroxylapatite, the final purity and composition, as well as pigmentation, of the neutral protease product depending upon the additional steps employed at an earlier stage in the overall process, as already stated.

Thus, the neutral protease or proteinase produced by a protease-producing strain of *Bacillus subtilis*, for example *B. subtilis* strain AM, can be isolated in pure form essentially free of alkaline protease (subtilisin), amylase, pigments and polysaccharides, or free of amylase and almost pigment-free, or free of alkaline protease but still containing amylase and pigment, from a starting source of clarified fermentation beer or redissolved crude solids precipitated from a fermentation beer by solvent addition, depending upon the exact sequence of steps employed prior to the adsorption of the neutral protease on hydroxylapatite and subsequent elution therefrom.

The overall procedure, as further indicated and depicted by the following examples, may therefore involve some or all of the following steps in a variety of sequences, some of those given being obviously applicable before the adsorption—elution process and others being applied subsequently for further purification of the neutral protease product.

(1) Clarification of a fermentation beer or a suspension of precipitated solids by filtration or centrifugation.

(2) Removal of some pigments by treatment with a suitable anion exchange resin either by a batch process or column chromatography.

(3) Removal of some impurities by precipitation by addition of excess calcium salts.

(4) Removal of amylase by acetone or isopropanol fractionation in the presence of calcium salts.

(5) Removal of amylase by a careful salt fractionation of the mixed enzyme solution.

(6) Removal of residual traces of amylase by adsorption on powdered starch, preferably in the presence of a low concentration of ethanol.

(7) Concentration and removal of some pigment by precipitation by an excess of organic solvent such as acetone, isopropanol or ethanol.

(8) Adsorption of the neutral protease on hydroxylapatite with removal of the alkaline protease which is not adsorbed. The neutral protease is subsequently eluted by a suitable eluting solution.

(9) Separation of the neutral protease from the eluting salt solution either by precipitation of the protease with ammonium sulfate, or by precipitation of the salt in an appropriate manner.

(10) Dialysis of the protease solution, as against 0.1% calcium acetate solution, to remove salts and other low molecular weight impurities.

(11) Lyophilization to obtain a solid form of the enzyme.

(12) Further purification by removal of higher or low molecular weight material if desired by passage of an enzyme solution from (9), (10), or redissolved product from (11), through a column of Sephadex G–100 (TM–AB Pharmacia; hydrophilic cross-linked dextran having a water-regain value of $10\pm1$) gel-filtration resin and re-lyophilization.

The hydroxylapatite adsorption and elution steps (8 above) are essential for separation of the alkaline and neutral proteases and recovery of the latter.

Lyophilization to obtain a more concentrated form of the starting solid enzyme mixture before redissolution may obviously be effected to advantage.

If it is desired to wash the hydroxylapatite adsorbent, after neutral protease has been adsorbed thereon, for further removal of undesired impurities, whether in column form or otherwise, a dilute solution of a soluble calcium salt, for example about 0.02% solution of a calcium salt, preferably calcium acetate, may advantageously be employed. Very dilute phosphate buffers, e.g., 0.01 M phosphate buffer pH 7.2, may also be employed for washing the adsorbent, e.g., column, if desired. Such solutions as are employed for washing of the column containing the adsorbed neutral protease should be at or about a neutral pH. Elution of the neutral protease from the column may then be effected employing a buffer of somewhat greater ionic strength, for example, 0.045 M phosphate buffer, also at or about neutral pH. Precipitation of the neutral protease from the eluted fractions may be effected using solid ammonium sulfate or other suitable precipitant, e.g., sodium sulfate, or the eluted neutral protease solution may be further treated with a calcium salt, for example, calcium acetate, in an amount up to about 2% by weight, in such case with adjustment of pH slightly upwardly to about 7.5 to produce a precipitate of calcium phosphate, which may then be removed by physical means such as filtration or centrifugation. Dialysis of the neutral-protease-containing supernatant, recentrifugation or filtration, and lyophilization further increases the purity of the neutral protease, as will be apparent.

Starting enzyme-containing beers can be obtained from microorganism fermentation, e.g., production of enzymes by bacteria, using well-known fermentation methods such as those generally described in Kirk-Othmer, Encyclopedia of Chemical Technology 8, 173–204.

The exact activity of the mixture of enzymes employed as starting material depends on the method of preparation and is not critical to the present invention providing only that the starting solution has the desired plural proteolytic activity. Various analytical methods are available to determine the activity of enzymatically active material, for example, the protease activity of proteolytic enzymes can be determined by well-known casein digestion methods. According to such tests, a protease catalyzes the hydrolysis of casein for a certain period of time and temperature and at a certain pH; the reaction is stopped by the addition of trichloroacetic acid and the solution is filtered. The color of the filtrate is developed by a Folin phenol reagent, and the level of enzyme activity is measured spectrophotometrically in units of casein tyrosine. This method is more fully described in the Journal of General Physiology 30, 291 (1947) and in Methods of Enzymology 2, 33 by Academic Press N.Y. (1955). Amylase activity is generally determined by the well-known dinitrosalicyclic acid method of Bernfeld.

A particularly effective source of mixed proteolytic enzymes which can be use as starting material in the present invention is a mutated *Bacillus subtilis* organism. The process for producing this organism and enzymes therefrom is described in U.S. Pat. 3,031,380. A culture of this *Bacillus subtilis* (strain AM) organism has been deposited with the United States Department of Agriculture, Agricultural Research Service, Northern Utilization Research and Development Division, 1815 North University St., Peoria, Ill. 61604, and has been assigned No. NRRL B-3411. The enzymatically active material produced by this organism has been found generally to consist of two proteases, approximately 65–75% neutral protease (activity at a pH of 7.0–7.5) and about 25–35% alkaline protease (activity at a pH of 9–10). A significant amount of amylase is also present. There are generally about 700 thousand to about 1.2 million units of neutral protease activity per gram and about 250 thousand to about 400 thousand units of alkaline protease activity per gram of isolated solids as determined by Anson's variation of the Kunitz "Casein" method. There are generally about 300 thousand to 350 thousand units of amylase activity per gram as determined by the Bernfeld method. As pointed out in the cited patent, the relative proportions of protease to amylase will vary depending on the exact conditions of growth of the microorganism, but we have found that the neutral and alkaline protease and the amylase will be produced, in at least some amounts, almost regardless of changes in the culture medium and other conditions of growth of the microorganism.

Another source of mixed enzymes which can be used as starting material in accord with the present invention is *B. subtilis* strain NRRL 644, *B. subtilis* strain NRRL 941, and *B. subtilis* strain IAM 1523 (Japanese Culture Collection). Still other *B. subtilis* and additional microorganisms are available which produce a mixture of neutral protease and alkaline protease, at least to a limited if not optimum extent.

DESCRIPTION OF THE PREFERRED EMBODIMENTS

The following examples are given by way of illustration only, and are not to be construed as limiting.

General outline of preparation of fermentation beer

A culture of *Bacillus subtilis* AM is inoculated into a sterile slurry of grains and other nutrient material (such as rice bran, corn meal, fish meal, wheat bran, Enzose (about 50–80% dextrose and the balance higher saccharides, being the dried mother liquor remaining from dextrose manufacture by enzymatic hydrolysis of corn starch), distillers solubles, corn steep liquor, etc.) containing protein, carbohydrate, minerals, and growth factors. The vessel is agitated and aerated by bubbling sterile air through the inoculated slurry. The pH may be controlled or left to achieve its own natural pH. Aliquots of the beer are removed for assay at various times and, when enzyme production is apparently a maximum, the fermentation beer is then centrifuged and/or filtered prior to enzyme isolation.

Some details and examples of this type of enzyme production method are given generally in U.S. Pats. 2,530,210 of C. V. Smythe, B. B. Drake and C. E. Neubeck (to Rohm & Haas Company, Nov. 14, 1950), and 2,549,465 of J. C. Hoogerheide and E. G. Laughery (to Pabst Brewing Company, Apr. 17, 1951); and particularly in U.S. Pat. 3,031,380 of Apr. 24, 1962.

The foregoing procedure, especially that of U.S. Pat. 3,031,380, is productive of a fermentation beer containing the desired enzyme mixture. For clarification purposes to give a water-clear beer for use as starting material, this fermentation beer may merely be centrifuged and/or filtered. Alternatively, the solid enzyme mixture may be precipitated by adding an excess of solvent, e.g., isopropanol or acetone, to the fermentation beer either without prior filtration or centrifugation or after a prior centrifugation and/or filtration, which is productive of a solid precipitate comprising an enzyme mixture, which may then be readily redissolved in water or aqueous solution to give a water-clear enzyme solution which may be used as starting material in the process of the invention. Obviously, the starting solution, by whichever procedure procured, may be subjected to addition centrifugation and/or filtration if desired to upgrade the quality of the starting enzyme solution.

EXAMPLE 1

On considerably purified lyophilized amylase-free enzyme mixture

Nine (9) liters of fermentation beer from a *B. subtilis* strain AM fermentation were clarified by centrifugation and then stirred with 200 gram DEAE-cellulose (diethylaminoethyl cellulose-acetate form pH 6.4) at pH 6.4 for 30 minutes to remove some of the pigment. The cellulose resin was removed by filtration and the filtrate re-treated with a further 100 gm. DEAE-cellulose in the same way. 80 gm. calcium acetate was added to the 8-liter filtrate, the pH adjusted to 7.5 and 2,240 grams of ammonium sulfate added with stirring. After stirring at 5° C. for 30 minutes, the precipitate was removed by filtration and a further 900 gm. ammonium sulfate was added to the supernatant and the precipitate collected by centrifugation and redissolved in about 1 liter 0.1% calcium acetate solution. 100 gm. powdered wheat starch and 120 ml. ethanol were added, the suspension stirred for 20 minutes and filtered. 2 liters cold (5°) acetone was added to the filtrate and precipitate collected by centrifugation, redissolved in 500 ml. of 0.1% calcium acetate and lyophilized (wt. 17.0 g.).

250 mg. of this partially purified enzyme-containing solid was dissolved in 25 ml. of 0.02% calcium acetate solution, the pH adjusted to 7.2 and the solution applied to a 1.2 x 7.0 cm. column of hydroxylapatite, washed with 0.1% calcium acetate. After the enzyme solution had been washed onto the column with a little calcium acetate solution, the column was eluted with 0.2 M phosphate buffer pH 7.0. The protein material eluted (monitored by absorbance at 280 mm.) was dialyzed at 5° against 0.1% calcium acetate solution overnight, centrifuged and lyophilized. Weight of product=56.75 mg. Specific activity protease pH 7, $12.5 \times 10^6$ mg.

EXAMPLE 2

On considerably purified amylase-free lyophilized enzyme mixture 300 mg. lyophilized partially purified enzyme (see Example 1) in 30 ml. 0.02% calcium acetate pH 7.2 was applied to a 1.6 x 7.0 cm. hydroxylapatite column (in 0.1% calcium acetate) and the column was washed with 0.02% calcium acetate pH 7.2 and then a phosphate buffer gradient was applied from a system containing 150 ml. water in the mixing chamber and 150 ml. 0.08 M phosphate pH 7.2 in the reservoir. The flow rate was about 1 ml. per minute and 5 ml. fractions were collected. After the first unadsorbed material had run through, a small peak was eluted followed by a large peak of active enzyme. The material in the large peak was dialyzed against distilled water at 5° C. for 4 hours, then 1% calcium acetate solution added to give a final concentration of 0.1%, the pH adjusted to 7.5, solids removed by centrifugation and the supernatant lyophilized. Weight of product=240 mg.; activity $4.0 \times 10^6$ u./gm. (Casein digestion units, Anson procedure, are used throughout for protease activity; dinitrosalicylic acid procedure of Bernfeld for amylase.)

EXAMPLE 3

On pooled lots of purified lyophilized amylase-free enzyme mixture 100 gm. crude precipitated enzyme mixture (precipitated from the beer produced by fermentation production of enzymes by *B. subtilis* strain AM using acetone or isopropanol) was stirred with 2 liters 0.1% calcium acetate solution, 5° C., 30 minutes and centrifuged to give 2 liters clear dark red-brown extract. 200 gm. DEAE-cellulose (acetate form pH 6.4) was added and the mixture stirred for 30 minutes to remove some of the pigment, then centrifuged to yield 1600 ml. yellow supernatant. 32 gm. calcium acetate was added and after stirring for 15 minutes at 5° the precipitate impurities removed by centrifugation. The pH of the supernatant was adjusted to 7.5 and 420 gm. ammonium sulfate added with stirring. The precipitate was collected and discarded. A further 170 gm. ammonium sulfate was added to the supernatant and, after stirring, the precipitate was collected by centrifugation and redissolved in 300 ml. 0.1% calcium acetate solution. 30 gm. pulverized wheat starch and 40 ml. ethanol was added and after stirring at 5° for 20 minutes the starch (including adsorbed amylase) removed by centrifugation. 650 ml. cold acetone was added to the supernatant and the precipitate collected by centrifugation, dissolved in 300 ml. 0.1% calcium acetate, centrifuged, dialyzed against 12 liters 0.1% calcium acetate at 5° overnight and lyophilized. Weight of product 3.730 grams. Protease activity $3.35 \times 10^6$ units/gram.

The products of several similar preparations were pooled, dissolved in distilled water, reprecipitated with cold acetone, collected by centrifugation, redissolved in 0.075% calcium acetate and lyophilized to yield 31.0 gm. product with a specific activity $4.15 \times 10^6$ u./g. protease.

3.00 gm. reprecipitated enzyme was dissolved in 150 ml. 0.02% calcium acetate solution, the pH adjusted to 7.5 and the solution applied to a 48 x 80 mm. column of hydroxylapatite. The column was washed with 0.02% calcium acetate and then with 0.01 M phosphate pH 7.2 and the enzyme eluted with 0.045 M phosphate pH 7.2. The fractions containing the enzyme were pooled (volume 400 ml.) and 8 grams calcium acetate added and the pH adjusted to 7.5 with NaOH. The precipitate was removed by centrifugation. The supernatant was dialyzed overnight against 12 liters 0.1% calcium acetate, recentrifuged and lyophilized. Weight of product was 620 mg.; Activity $4.25 \times 10^6$ u./gram.

EXAMPLE 4

On crude Enzyme mixture 200 mg. crude precipitated enzyme (precipitated from the beer of a *B. subtilis* AM enzyme-producing fermentation using isopropanol or acetone) was dissolved in 10 ml. water and shaken periodically with 2 ml. (settled volume) hydroxylapatite over a 1 hour period. The mixture was filtered and the supernatant found to contain only 8% of the protease and 7% amylase. The filtered hydroxylapatite was eluted with 50 ml. 0.05 M phosphate pH 6.8. The recovery of protease was 30% and amylase 38%.

EXAMPLE 5

On lyophilized decolorized enzyme mixture

A crude precipitated enzyme (obtained from fermentation beer as in Example 3) was partially purified as in Example 3, the DEAE-cellulose treatment to remove some of the pigment being carried out 3 times and the acetone precipitate washed by decantation with acetone/water mixture (2 to 1), redissolved in 0.02% calcium acetate and lyophilized. Protease activity $2.3 \times 10^6$ u./g.

500 mg. lyophilized enzyme in 25 ml. 0.02% calcium acetate pH 7.2 was applied to a 2.8 x 6.0 cm. column of hydroxylapatite. The column was washed first with 0.02% calcium acetate and then with 0.01 M phosphate pH 7.2. The protease was eluted with 0.045 M phosphate pH 7.2. The protein was precipitated from the pooled enzyme fractions by addition of solid ammonium sulfate to 0.6 saturation. The precipitate was collected by centrifugation, redissolved in 0.1% calcium acetate, dialyzed overnight against 0.02% calcium acetate, recentrifuged and lyophilized. Weight of product 85.0 mg.; Protease activity $7.17 \times 10^6$ u./gm.

EXAMPLE 6

On decolorized purified lyophilized amylase-free enzyme mixture 100 gm. crude precipitated enzyme mixture (obtained from fermentation beer as in Example 3) was stirred into 1 liter cold (5° C.) distilled water for 10 minutes and 1 liter cold acetone added slowly with stirring. 20 gm. calcium acetate was then added and stirred in. After stirring for 20 minutes at 5°, the precipitate (amylase and impurities) was removed by centrifugation and a further 1 liter cold acetone added with stirring to the supernatant and this precipitate collected by centrifugation and redissolved in about 700 ml. of 0.1% calcium acetate solution. This enzyme solution was stirred with 50 gm. DEAE-cellulose (acetate form pH 7.0) for 20 minutes to remove some of the pigment then filtered to give 650 ml. clear yellow solution which was lyophilized to give 10.1 gm. product.

2 gm. lyophilized product was redissolved in 100 ml. 0.1% calcium acetate, the pH adjusted to 6.5, and the solution applied to a 45 x 70 mm. hydroxylapatite column. The column was washed with 0.1% calcium acetate solution, then with 0.01 M phosphate pH 7.5. The protease was then eluted with 0.06 M phosphate pH 7.5. The eluted enzyme solution was treated with calcium acetate (2% by weight), the pH adjusted to 7.5 with N/1 NaOH, and the precipitate of calcium phosphate removed by centrifugation. The supernatant was dialyzed against 20 liters 0.01% calcium acetate solution at 5° overnight, recentrifuged and lyophilized. Weight of product 368 mg.; specific activity $16.0 \times 10^6$ u./g.

EXAMPLE 7

On acetone-precipitated amylase-free lyophilized protease fraction 8.96 gm. enzyme mixture (precipitated from a *B. subtilis* AM fermentation beer by acetone fractionation) was stirred into 400 ml. water at 5° and 350 ml. acetone added slowly with stirring followed by addition of 8 gm. calcium acetate. The precipitate was removed by centrifugation and the protease mixture precipitated by addition of a further 500 ml. acetone, collected by centrifugation and resuspended in 300 ml. 0.01% calcium acetate 30 gm. DEAE-cellulose (acetate form, pH 6.5) was added to remove some of the pigment and after stirring 20 minutes at 5° removed by filtration and the filtrate lyophilized. Weight of partially purified product was 3.00 grams.

1 gram of this product was dissolved in 50 ml. 0.1% calcium acetate, and applied to a 45 x 75 mm. hydroxylapatite column. The column was washed with 0.1% calcium acetate, then with 0.01 M phosphate pH 7.5, and the enzyme then eluted with 0.06 M phosphate pH 7.5. To the 270 ml. enzyme solution was added 5 gm. calcium acetate and the pH adjusted to 7.0, the precipitate removed by centrifugation, the supernatant dialyzed against 20 liters 0.01% calcium acetate at 5° overnight, then lyophilized. Weight of product was 520 mg., protease activity $7.40 \times 10^6$ u./gram. 506 gm. this product was dissolved in 5 ml. 0.01% calcium acetate solution at 5°, centrifuged to remove insolubles and applied to a 1.0 x 60 cm. column of Sephadex G–100 (TM-hydrophilic cross-linked dextran having a water-regain value of $10 \pm 1$; AB Pharmacia) in 0.01% calcium acetate solution and the eluting protein pooled and lyophilized. Weight of product 205 mg., specific activity $18.0 \times 10^6$ u./g.

EXAMPLE 8

On lyophilized decolorized enzyme material— Amylase removed 750 mg. of a lyophilized part-purified enzyme mixture which had amylase removed by acetone fractionation in the presence of calcium acetate and pigment removed by DEAE-cellulose treatment, was dissolved in 75 ml. 0.1% calcium acetate solution and applied to a 48 x 100 mm. hydroxylapatite column. The column was washed with 0.1% calcium acetate solution (200 ml.) and then with 0.01 M phosphate pH 7.2 (200 ml.) The protease was eluted with 200 ml. of 0.01 M phosphate pH 7.2. The phosphate was removed from the eluted enzyme solution by addition of solid calcium acetate (2% w./v.) the pH adjusted to 7.0 with N/1 NaOH and the precipitate removed by centrifugation. The supernatant was dialyzed against 20 liters 0.01% calcium acetate and lyophilized to give 290 mg. product, protease activity $13.4 \times 10^6$ u./g.

EXAMPLE 9

Directly from clarified enzyme-containing beer

A fermentation beer obtained by removal of solids from the product of the fermentation production of enzymes by *B. subtilis* AM, was filtered with the aid of Hyflo Supercel TM-diatomaceous earth to yield a clear brown filtrate, 500 ml. clarified beer was adjusted to pH 7.0 and applied directly to a 48 x 125 mm. hydroxylapatite column. The column was washed with 200 ml. distilled water and then eluted with 0.1 M phosphate pH 7.2. The enzyme containing eluate was treated with solid calcium acetate (2% w./v.) while the pH was adjusted to 7.0 with N/1 NaOH, centrifuged and the supernatant dialyzed against 0.01% calcium acetate overnight at 5° C. and lyophilized to yield 760 mg. product, protease $5.3 \times 10^6$ u./g. Amylase $5.0 \times 10^6$ u./g.

EXAMPLE 10

A clarified fermentation beer from the fermentation of *B. subtilis* var. *amylosacchariticus*, a known producer of neutral protease, is treated in the manner of Example 6. Similar adsorption fractionation results are obtained.

The same results are obtained using water-clear fermentation beers from the other *B. subtilis* strains previously mentioned.

EXAMPLE 11

A synthetic mixture comprising a water-clear solution of neutral protease and alkaline protease is prepared and adjusted to a pH of approximately 6.5. The product is treated in accord with the procedure of Example 9. Fractionation of the solution into its neutral and alkaline protease fractions is readily effected and the various protease fractions are separated from each other. The neutral protease is isolated after elution in the manner of Example 9.

It is to be understood that the invention is not to be limited to the exact details of operation or exact compounds, compositions, or procedures shown and described, as obvious modifications and equivalents will be apparent to one skilled in the art, and the invention is therefore to be limited only by the full scope of the appended claims, including the application of the doctrine of equivalents thereto.

I claim:

1. Process for the separation of neutral protease from a water-clear aqueous solution containing a mixture of neutral protease and alkaline protease produced by a neutral and alkaline protease-producing strain of a Bacillus species, which comprises the step of selectively adsorbing the neutral protease on hydroxylapatite at a pH of about 6 to about 8.

2. Process of claim 1, wherein the adsorbed neutral protease is subsequently eluted from the hydroxylapatite at a pH of about 6 to about 8.

3. Process of claim 2, wherein the adsorption is at a pH between about 6.5 and 7.5 and wherein the elution is at a pH between about 6.8 and 7.5 using a phosphate buffer solution.

4. Process of claim 2, wherein the adsorption is effected using a water solution or a solution stabilized by the presence of a minor amount of a soluble calcium salt, and wherein the elution is effected using an eluting buffer solution.

5. Process of claim 2, wherein the adsorption is effected from an approximately 0.1% calcium acetate solution and wherein the elution is effected using a phosphate buffer solution of at least about .04 M concentration.

6. Process of claim 1, wherein the starting solution contains up to about 2.5% of dissolved solids.

7. Process of claim 1, wherein the starting solution contains about 1% of dissolved solids.

8. Process of claim 1, wherein the starting solution contains an enzyme level not greater than about 50,000 protease units per milliliter as determined by the Anson variation of the Kunitz casein digestion method.

9. Process of claim 2, wherein hydroxylapatite is in the form of a column and wherein the column bearing adsorbed neutral protease is washed with a dilute calcium salt solution prior to elution.

10. Process of claim 2, wherein the starting solution is a clarified fermentation beer from the fermentation production of enzymes by a neutral and alkaline protease-producing strain of a Bacillus species, or a clarified aqueous solution of previously-precipitated and redissolved solids from such Bacillus species fermentaion beer.

11. Process of claim 10, wherein the protease-producing microorganism is a *Bacillus subtilis* strain.

12. Process of claim 10, wherein amylase is previously removed from the starting solution.

13. Process of claim 10, wherein amylase is substantially absent from the starting solution and at least some pigment has been previously removed by adsorption on an anionic exchange resin.

14. Process of claim 2, wherein neutral protease is separated from the eluant solution by precipitation of the protease.

15. Process of claim 2, wherein neutral protease is separated from the eluant solution by precipitation of salts from the eluant solution and dialysis of the residual solution.

16. Process of claim 2, wherein the isolated neutral protease is subsequently isolated in solid form by lyophilization.

17. Process of claim 3, wherein the hydroxylapatite is in the form of a column, wherein the adsorption is effected from an approximately 0.1% calcium acetate solution which contains about 1% of dissolved solids and wherein the elution is effected using an aqueous phosphate buffer solution of about .04–0.2 M concentration, and wherein the enzyme solution is a clarified fermentation beer from the fermentative production of neutral and alkaline protease by a *Bacillus subtilis* strain or a clarified aqueous solution of previously-precipitated and redissolved solids from a fermentation beer produced by said strain from which amylase and at least some pigment has been removed.

18. Hydroxylapatite containing adsorbed thereon neutral protease produced by a neutral and alkaline protease-producing strain of a species of Bacillus and substantially free of alkaline protease produced by the same strain and normally associated therewith.

19. The product of claim 18 wherein the hydroxylapatite contains adsorbed thereon both said neutral protease and amylase.

20. The product of claim 18 wherein the protease is obtained from a neutral and alkaline protease-producing strain of a *Bacillus subtilis* species.

21. The product of claim 19 wherein the protease is obtained from a neutral and alkaline protease-producing strain of a *Bacillus subtilis* species.

References Cited

Tsuru et al.: Agr. Biol. Chem., vol. 30, No. 7, p. 651–658 (1966).

Dixon et al.; Enzymology, 2nd ed. 1964, pp. 43–44.

Colowick et al.: Methods in Enzymology, vol. 5, pp. 27–32, (1962).

LIONEL M. SHAPIRO, Primary Examiner

U.S. Cl. X.R.

195—66R, Digest 11